(12) United States Patent
Dufresne (10) Patent No.: US 8,870,088 B2
(45) Date of Patent: Oct. 28, 2014

(54) INSULATING ANTI-CORROSIVE RAIL CLAMP INTEGRALLY MADE OF POLYMERIC COMPOSITION

(75) Inventor: Robert Dufresne, St-Bruno (CA)

(73) Assignee: Pultrusion Technique Inc. (CA)

( * ) Notice: Subject to any disclaimer, the term of this patent is extended or adjusted under 35 U.S.C. 154(b) by 734 days.

(21) Appl. No.: 12/522,205

(22) PCT Filed: Dec. 20, 2007

(86) PCT No.: PCT/CA2007/002324
§ 371 (c)(1),
(2), (4) Date: Aug. 25, 2009

(87) PCT Pub. No.: WO2008/080219
PCT Pub. Date: Jul. 10, 2008

(65) Prior Publication Data
US 2010/0044451 A1 Feb. 25, 2010

(30) Foreign Application Priority Data
Jan. 5, 2007 (CA) .................................... 2572807

(51) Int. Cl.
*E01B 9/00* (2006.01)
*E01B 9/28* (2006.01)
*C08J 5/04* (2006.01)

(52) U.S. Cl.
CPC ... *E01B 9/00* (2013.01); *E01B 9/28* (2013.01); *C08J 5/04* (2013.01)
USPC ........................................................ 238/315

(58) Field of Classification Search
USPC ................ 238/264, 281, 310, 315–317, 321, 238/336–338, 343
See application file for complete search history.

(56) References Cited

U.S. PATENT DOCUMENTS

| 3,610,526 | A | * | 10/1971 | Burwell ......................... 238/310 |
| 3,658,247 | A | | 4/1972 | Serafin et al. |
| 3,688,984 | A | * | 9/1972 | Sonneville .................... 238/349 |
| 4,066,212 | A | * | 1/1978 | Sonneville .................... 238/349 |
| 4,353,503 | A | * | 10/1982 | Duchemin ................... 238/349 |
| 4,569,478 | A | * | 2/1986 | Bryan ........................... 238/349 |
| 4,635,846 | A | | 1/1987 | Todd |
| 6,923,381 | B2 | | 8/2005 | Marshall et al. |

FOREIGN PATENT DOCUMENTS

| CA | 1046034 A1 | 1/1979 |
| CA | 1076082 A1 | 4/1980 |
| FR | 2 419 353 A1 | 10/1979 |
| FR | 2 634 801 A1 | 2/1990 |
| GB | 990 895 A | 5/1965 |

* cited by examiner

Primary Examiner — R. J. McCarry, Jr.
(74) Attorney, Agent, or Firm — Baker Hostetler LLP (57) ABSTRACT

The invention relates to a rail clamp for fastening rail equipment, said rail clamp being integrally composed of a polymeric composition produced by pultrusion or molding, vacuum molding or compression molding. It has high mechanical strength. It is anticorrosive and insulating and is preferably composed of a resin and reinforcing fibers and/or a thermoplastic. It is advantageously formed as a one piece structure. The rail clamp is especially used to fasten rails to base slabs and has economic advantages compared to the rail clamps known in the art, which are made of steel coated with rubber.

20 Claims, 5 Drawing Sheets

INSULATING ANTI-CORROSIVE RAIL CLAMP INTEGRALLY MADE OF POLYMERIC COMPOSITION

CROSS-REFERENCE TO RELATED APPLICATIONS

This application is a National Stage of International patent application PCT/CA2007/002324, filed on Dec. 20, 2007, which claims priority to foreign application CA 2,572,807, filed on Jan. 5, 2007, the disclosures of which are incorporated herein by reference in their entirety.

FIELD OF THE INVENTION

The present invention relates to the field of railway equipment, and more specifically concerns a rail clamp usable with a rail fastening system.

BACKGROUND

It is known in the art that railway equipment must support and guide rail transit vehicles circulating through transportation networks. Insulating supports, known as "rail clamps", are used in rail fastening systems to fasten rails to base slabs in public subways, for example.

Rail clamps are used to hold and anchor the rail to the reinforced concrete track. To be usable, rail clamps must show a high mechanical bending strength and also must allow the electrical insulation of the rail. Furthermore, when a train goes across the rail, the rail clamp must be somewhat bendable, i.e. it must produce movement so that the rail may slightly lift.

Due to the mechanical and dielectric requirements mentioned above, rail clamps have almost exclusively been made of steel and rubber. They are made of a metallic body partially covered with insulating rubber and optionally with lacquer. The rail clamp's steel is cast in foundries, the seams of the piece being created by the mold being removed by decoring or tumbling, or by another standard procedure. Steel often has a rigidity modulus of 10 to 20 million psi. The surface of the steel piece where the rubber must be placed is prepared according to specified procedures. Often a finish must be used before vulcanizing the rubber, to mold it on the metallic piece.

The process to manufacture rail clamps in two parts comprises many manufacturing, preparation and reinforcement steps, which increases the amount of time and production cost.

Furthermore, rail clamps made of steel and rubber are prone to rust, which leads to the separation and the eventual partial peeling between the components. Subways are often underground, which is usually a humid environment. Consequently, steel and rubber two-part rail clamps are very prone to rust. Rusting is especially fast in locations where surface tensions are the highest, i.e. the surface of contact between rubber and steel. Furthermore, when railway tracks are placed outdoors, they are exposed to rain, which can worsen rusting and lead to electrical leaks.

One major problem encountered with the use of this type of rail clamp made from materials combined into distinct layers is when rust has covered a certain amount of surface between the rubber and steel parts, the rubber peels away from the steel. This peeling can create a short-circuit. Known rail clamps comprise metallic parts which are conductive and which provide the structural mechanical properties of the rail clamp piece.

Figure 1:
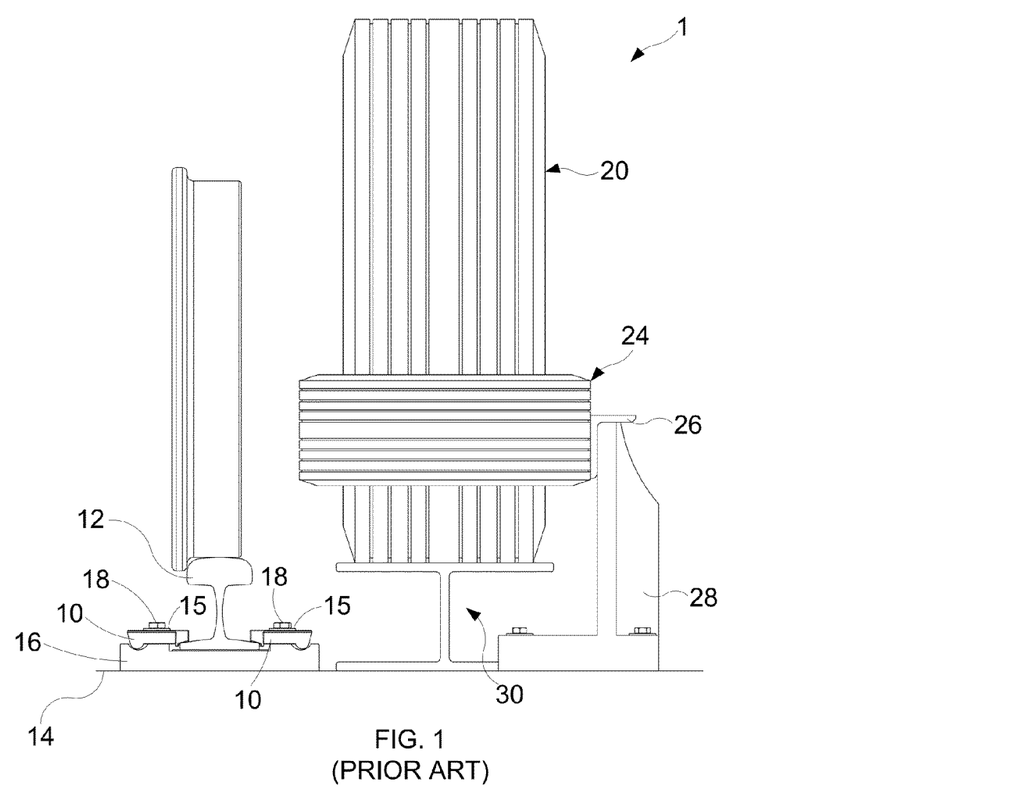
FIG. 1 (prior art) is a transverse side view of a track with a rail.
Figure 2:
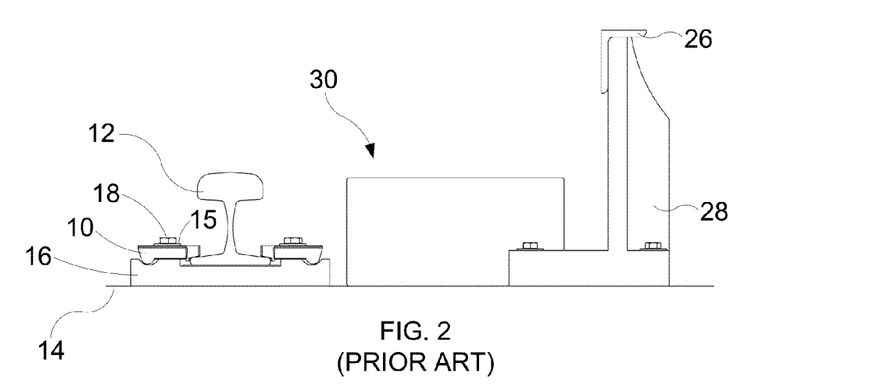
FIG. 2 (prior art) is a transverse side view of a track with a rail.

Rail clamps are often used in rail systems as shown in FIGS. 1 and 2. These Figures show a side of a track (1) with a rail (12). The rail clamps (10) are there to fasten the rail (12) to a base slab (14).

As illustrated, the rail clamp (10) is used to keep the rail (12) against an insulating rail road saddle (16) or directly against a rail road tie (14). Preferably, the rail (12) is placed in an insulating saddle (16). The rail clamps (10) are then placed as to overlap the part of the rail (12) in the insulating saddle (16) and the edge of the saddle. Advantageously, the rail clamps (10) hold the rail (12) to the saddle (16) by using a screw (18) that goes through the rail clamp (10) and the saddle (16). The screw (18) can be a bolt held down by a nut (15). The rail clamp (10) fastens the rail (12) in place like a clamp.

Other elements of the rail system are a carrying wheel (20); a guide wheel (24); a guide bar (26); insulators (28); and a running track (30) (made of steel as seen in FIG. 1 or of concrete as seen in FIG. 2).

Figure 3:
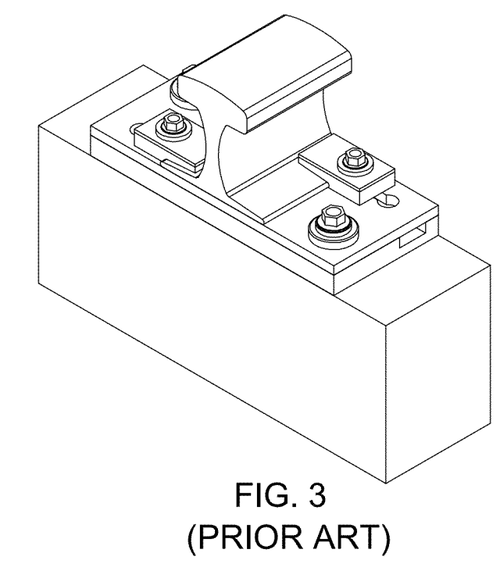
FIG. 3 (prior art) is a perspective side view of a track with a rail.

FIG. 3 shows that the rail clamps can be spaced out to fasten the rail.

Figure 4:
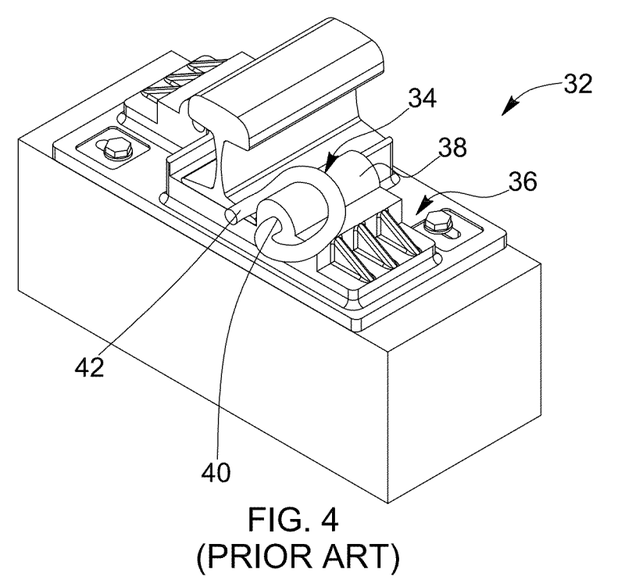
FIG. 4 (prior art) is a perspective side view of a hooked spike rail clamp in a "hooked spike" railway system.

Another type of rail clamp used to fasten the rail to the base slab is a "hooked spike" rail clamp, which is made of two parts and which is part of the "hooked spike" railway system, as shown in FIG. 4.

Figure 5:
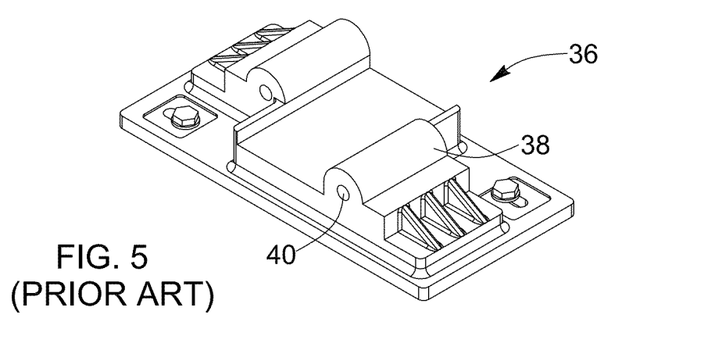
FIG. 5 (prior art) is a perspective side view of the rail road saddle in the railway system of FIG. 4.

The "hooked spike" system (32) comprises a "hooked spike" clamp (34) and a modified saddle (36) with a lower section (38) bearing a hole (40). The hooked spike rail clamp (34) effectively acts as a hook clamp element, and is usually shaped as a helical clamp comprising a first end, a second end and a leverage point between them. This first end is inserted in the hole (40) of the lower section, the second end (42) pushes against the rail while the leverage point pushes against the lower section (38), allowing the rail to be clamped to the base slab. FIG. 5 shows the modified saddle (36) used in this type of railway system.

The lower section (38) of the modified saddle (36) is usually made of an insulating material such as a polymer, while the hooked spike element (36) is often metallic. There is thus still a joint construction which can lead to rusting and separation problems. Furthermore, this hooked spike system comprises metallic elements that conduct electricity and/or joint components that lead to problems and difficulties in ensuring the safety of workers and the general public.

The hooked spike clamp system is costly and makes installation and inspection difficult.

Figure 6:
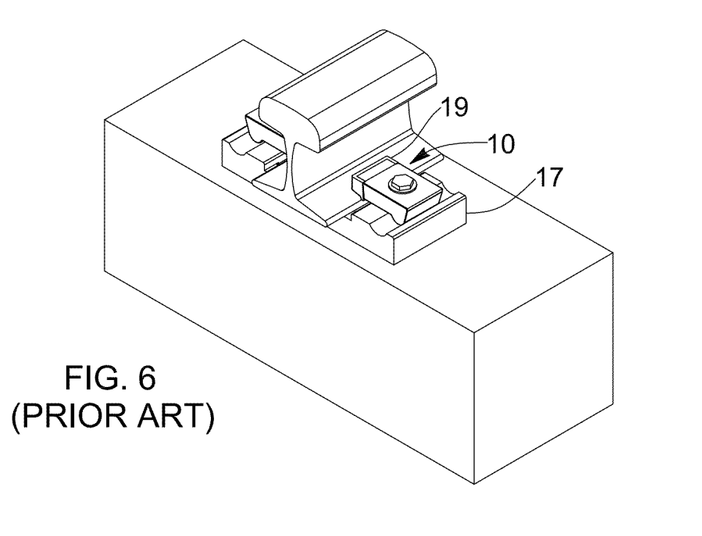
FIG. 6 (prior art) is a perspective side view of a rail clamp covered with rubber in a railway system.
Figure 7:
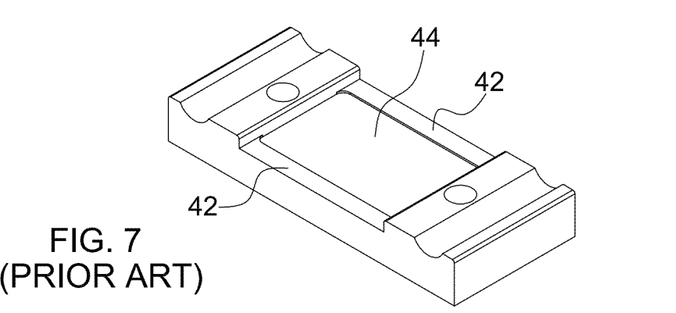
FIG. 7 (prior art) is a perspective side view of the rail road saddle of the railway system of FIG. 6.

FIG. 6 shows a railway system in which a rail clamp according to prior art is used. This rail clamp comprises a steel body (17), and a rubber sheet (19) at one end. FIG. 7 shows saddle with edges (42) which define a groove (44). Rubber can be put in the groove (44) to be in contact with the rail, optionally to reduce vibrations. This type of rail road saddle often needs to be manufactured by compression molding.

Figure 8:
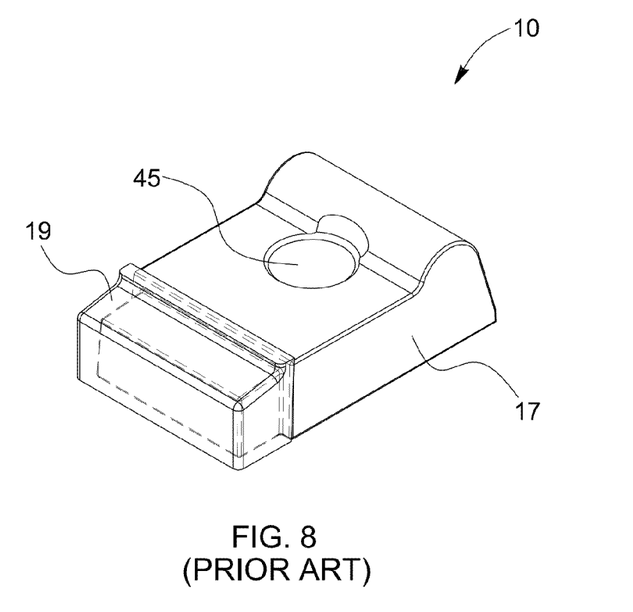
FIG. 8 (prior art) is a perspective view of a rail clamp made of steel and rubber.

FIG. 8 shows a known rail clamp. This rail clamp (10) comprises a steel body (17) with a hole (45) and a rubber coating (19).

The current used in these systems is often from 748 to 778 Volts. It is very dangerous to work with these high voltages and monitoring of these rail clamps is very important, arduous and expensive.

SUMMARY OF THE INVENTION

The present invention proposes to remedy the above-noted problems.

More specifically, the invention concerns a rail clamp to fasten rail equipment, said rail clamp being anticorrosive, insulating and integrally composed of a polymeric composition produced by pultrusion, molding, casting, compression, filament winding or winding.

According to a preferred aspect of the invention, the rail clamp is formed in one piece.

According to a first preferred embodiment of the invention, the rail clamp is composed as a polymeric composite comprising:
- a synthetic resin; and
- reinforcing fibers.

Preferably, the resin is chosen from epoxies, polyesters, vinyl esters and urethanes. Also preferably, the fibers are chosen from glass, aramid, ceramic, cardboard, sisal, cotton, flax or hemp.

According to a second preferred embodiment of the invention, the rail clamp comprises a thermoplastic polymer, preferably chosen from polyesters, polyacetal homopolymers and polycarbonates.

The invention also concerns a railway system comprising:
- a rail with an upper section and a lower section;
- at least one saddle for supporting the lower section of the rail;
- at least one rail clamp as defined above, the rail clamp having a surface, the surface being in contact with the lower section of the rail and the rail clamp being fastened to the saddle to allow a pressure of the rail clamp's surface against the lower section of the rail to prevent substantial displacement of the rail.

Because it is integrally composed of a polymeric composition produced by pultrusion, vacuum molding, compression molding or by one of the other above-mentioned methods, the rail clamp according to the invention is not susceptible to the peeling problems affecting existing rail clamps. The invention thus has a significant advantage compared to those of the prior art while offering similarly acceptable properties. Furthermore, the rail clamp according to the invention does not have any of the problems related to the joint construction which the rail clamps in the prior art encounter.

To better understand the invention and its advantages, a non-restrictive description of preferred embodiments will be presented herein below, referring to the enclosed drawings.

BRIEF DESCRIPTION OF THE DRAWINGS

FIG. 10 is a perspective view of the rail road saddle of the railway system of FIG. 9a.

DESCRIPTION OF A PREFERRED EMBODIMENT OF THE INVENTION

The rail clamp according to the invention, like existing rail clamps, is made to fasten rails to rail road ties in a railway transportation system, preferably in a subway. The rail clamp may however also be used to fasten other types of rail equipment.

This invention avoids using metallic parts, which are electrically conductive and make up the structural mechanical properties of the clamp piece. This rail clamp is integrally made of a polymeric material, preferably in one piece. This substantially integral rail clamp replaces two part heterogeneous rail clamps. This lowers the part buying cost and the cost of installation and use.

FIG. 6 shows a known rail clamp (10) according to a first old concept. This rail clamp (10) is made of a steel body (17) and a rubber covering (19). FIG. 6 also shows a railway system.

Figure 9A:
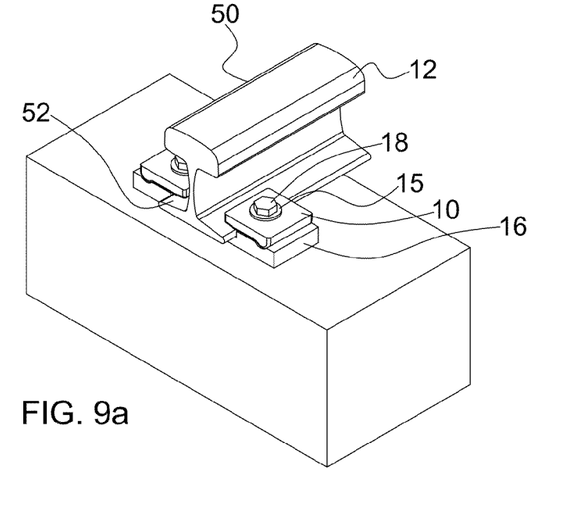
FIGS. 9a and 9b respectively show a perspective view and a cross-sectional view of a railway system comprising a rail fastened by rail clamps according to a preferred embodiment of the invention.

The rail clamp (10) according to the invention as shown in FIG. 9a is notably different from the prior art as it is integrally composed of a polymeric composition preferably made by pultrusion or compression molding.

Accordingly, the rail clamp (10) according to the invention has anticorrosion and insulating (dielectric) properties, as well as acceptable mechanical properties.

However, the rail clamp's manufacturing method is not limited to pultrusion, but may also by made by other molding processes or polymer manufacturing processes, such as contact molding, centrifugal casting, winding and press molding, among various other manufacturing methods allowing formation of a polymer rail clamp to fasten a rail in place. The manufacturing method must lead to an anticorrosion and dielectric rail clamp with mechanical properties allowing it to fasten railway equipment.

As illustrated on FIG. 9a, the rail clamp (10) according to a preferred embodiment, bears a hole (46), like the rail clamps of the prior art (e.g. as shown in FIG. 6). The hole (46) can be made after pultrusion of the rail clamp (10), or during the molding process. The hole (46) allows a screw to fasten it in place. However, the hole (46) is not necessary if other attachment means are used to fasten the rail clamp (16).

The shape of the rail clamp (10) allows it to overlap the rail (12) and the rail road saddle (16) to be in alignment. The rail clamp piece (10) may be machined to form it according to the requirements of the specific system and existing equipment, but it may have another shape according to other fastening methods.

The rail clamp (10), once installed, must be mechanically very strong, allow a certain flexibility, be corrosion resistant and be dielectric.

A rail clamp (10) with all these characteristics has been manufactured from a polymer through the process of pultrusion or vacuum molding or compression molding. One or multiple polymers are pultruded to form the rail clamp (10). Pultrusion is also known as a "pulled extrusion", and makes it possible to obtain polymer parts with the desired mechanical features. Advantageously, the insulating and corrosion resistant rail clamp is pultruded in monopiece and only requires finishing steps to create the final product. The rail clamp (10) may also comprise two or more parts pultruded separately, which are attached to one another with attachment means (nails, screws, glue, mechanical means, etc.) to produce the rail clamp part.

In a first preferred embodiment of the invention, the rail clamp (10) is manufactured from a resin and multiple fibers. The resulting part is a composite. The resin is preferably epoxies, polyesters, vinyl esters and/or urethanes. They are used with non-conductive fibers made of either glass, aramid, ceramic, cardboard, crystal, cotton, flax or hemp. Preferably, the rail clamps are provided with rovings and/or mats, depending on the desired mechanical and electrical properties.

The fibers impregnated within the resin are preferably expressly placed in different directions as to produce the strength required of the rail clamp. The quantities, concentrations and orientations of the fibers (or other reinforcing materials) are determined by a person skilled in the art so that the rail clamp can meet the mechanical and electrical requirements.

According to a second preferred embodiment, the rail clamp (10) is made of a polymer such as polyesters, polyacetal homopolymers and/or thermoplastic polycarbonates, or other appropriate polymers.

The polymers may preferably be non saturated polyesters.

The rail clamp according to the invention has a high mechanical quality and allows electrical insulation and resists corrosion. It is also non combustible and shows electrical resistivity, resistance to elongation and rupture, modulus of elasticity; thermoplasticity and anticorrosion properties, amongst other properties especially desirable for subway rail uses.

The rail clamp is preferably part of a railway system. Since there are multiple types of railway systems, the rail clamp is preferably manufactured according to the requirements of the chosen system.

The rail clamp according to the invention may be, e.g. part of a railway system described in the BACKGROUND section above, but may also be used in other railway systems known to a person skilled in the art.

Figure 9B:
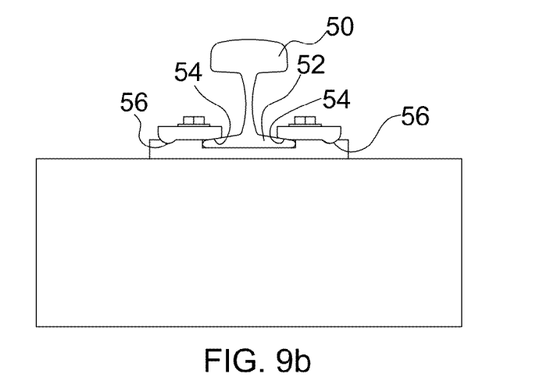

The system according to the invention, as shown in FIGS. 9a and 9b, comprises a rail (12) with an upper section (50) and a lower section (52). The system also comprises a rail road saddle (16) to support the rail (12) and the rail clamp as described above. The rail clamp has a first surface (54) and a second surface (56). The first surface is put in contact with the lower section (52) of the rail (12) and the second surface is attached to the rail road saddle (here, in a groove (58) of the rail road saddle) to allow the first surface (54) to press against the lower section (52) of the rail (12) to prevent substantial displacement of the rail. Preferably, the rail clamp is simply attached to the saddle and is pressed against the lower section of the rail at the first surface.

As shown in FIG. 9a, the rail clamp and the rail road saddle may have cooperating curvatures. The curvature of the rail clamp is preferably convex, while that of the rail road saddle is concave. This curvature cooperation may help to maintain the rail clamp in the correct orientation relative to the rail, by discouraging rotation or displacement on the bolt, and re-orienting the rail clamp to the correct orientation after slight displacements of the rail clamp caused by the train's crossing. Nevertheless, the rail clamp may also be shaped as a simple plate, without any curves. In such an embodiment, the bolt or other fastening means would fasten the rail clamp in place. Manufacturing rail clamps as plates may facilitate their production.

Figure 10:
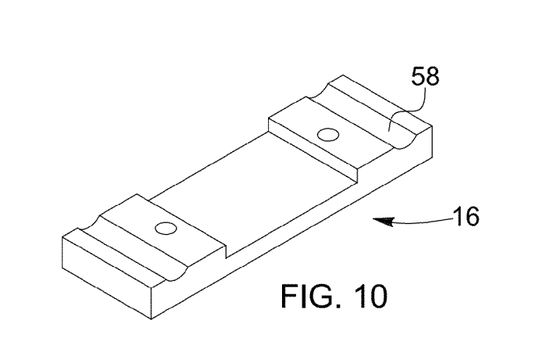

The rail clamp according to the invention is preferably used with a rail road saddle as shown in FIG. 10, and in a railway system as shown in FIGS. 9a and 9b. The rail road saddle (16) shown in FIG. 10 is notably missing edges (i.e. the edges (42) in FIG. 7), and can thus be more easily manufactured. Preferably, the rail road saddle is manufactured by pultrusion, or another method mentioned above. Also preferably, the rail road saddle has a groove (58) on each side of the rail, each groove cooperating with the second surface (56) of the rail clamp.

According to FIG. 9a, the system according to the invention comprises a rail (12), a rail road saddle (16) to support the rail (12), and a rail clamp as defined above in any one of the preferred embodiments. The rail clamp is placed against both the rail and the rail road saddle to prevent substantial displacement of the rail. Preferably, there are multiple rail clamps placed along the rail, either offset or aligned with one another. The distance between the rail clamps may be determined by a person skilled in the art. Preferably, the saddle is manufactured in the same fashion as the rail clamp.

Different transport companies have different requirements when it comes to rail equipment, and more specifically when it comes to rail clamps. Although the following properties have been measured, the rail clamp according to the invention is not limited to the data listed below. The rail clamp can have multiple combinations of mechanical and electrical properties, which make it sufficient for the application and fastening of railway equipment, and which are well known to a person skilled in the art.

Furthermore, the necessary properties to fasten the rail clamp to the rail depend on the way the rail clamp is manufactured, i.e. the preferred embodiment as well as the preferred aspects of the invention. If a "hooked spike" rail clamp is called for, the spike element must have the flexibility to allow the spike to clamp to the rail. One may ensure that the spike element acts like a spring or be more rigid, depending on the preferred embodiment of the rail clamp.

The following data relate to properties of pultruded profiles reinforced with mats and rovings:

| PROPERTIES OF PULTRUDED PROFILES REINFORCED WITH MATS* | | | | | | |
|---|---|---|---|---|---|---|
| Polyester resin: High deflection temperature, isophthalic antiacid. | | | | | | |
| PROPERTY | ASTM NORM | UNIT | 35 à 45% Lg. | Tr. GLASS | 45 à 55% Lg. | Tr. GLASS |
| Stress | D-638 | psi × $10^3$ | 30 | 7 | 45 | 9 |
| Modulus (T) | | psi × $10^6$ | 2.3 | 0.8 | 2.5 | 1 |
| Deflection | D-790 | psi × $10^3$ | 30 | 10 | 45 | 15 |
| Modulus (F) | | psi × $10^6$ | 1.3 | 0.6 | 1.8 | 0.8 |
| Compression | D-695 | psi × $10^3$ | 20 | 12 | 30 | 15 |
| Modulus (C) | | psi × $10^6$ | 2.3 | 0.8 | 2.5 | 1 |
| Beaming stress | | psi × $10^3$ | 137.8 | 137.8 | 206.7 | 206.7 |
| Izod impact | D-256 | ft-lbs/in | 20 | 4 | 28 | 4 |
| Hardness | | | 50 | | 50 | |
| BARCOL | | psi × $10^3$ | 4.5 | 4.5 | 5.5 | 5.5 |

-continued

PROPERTIES OF PULTRUDED PROFILES REINFORCED WITH MATS*
Polyester resin: High deflection temperature, isophthalic antiacid.

| PROPERTY | ASTM NORM | UNIT | 35 à 45% Lg. | Tr. GLASS | 45 à 55% Lg. | Tr. GLASS |
|---|---|---|---|---|---|---|
| Shearing strength | | | | | | |
| Torque | | psi | nil | nil | nil | nil |
| Dielectric strength (perp. oil) | D-149 | V/mil | 200 | 25 | 200 | 35 |
| Dielectric constant | D-150 | 60 Hz | 4.5 | | 4.8 | |
| Dielectric loss | D-669 | Room temperature | 0.04 | | 0.04 | |
| Electric arc | D-495 | Sec. | 80 | | 120 | |
| Density | | lbs/in cu. | 0.060 | | 0.064 | |
| Specific weight | | lbs/in cu. | 1.68 | | 1.75 | |
| Specific heat | | Btu/lb/° F. | 0.862 | | 0.862 | |
| Coefficient of thermal expansion | | In/In/° F. | $4.4 \times 10^{-6}$ | | $4.4 \times 10^{-6}$ | |
| Thermal conductivity | | Btu in/H ft² ° F. | 2 | | 2 | |
| Water absorption | D-570 | Max. % | 0.7 | | 0.6 | |
| Inflammability | | | nil | nil | nil | nil |

1 - Common load for a standard profile
2 - Enhanced construction for a specific function
*Pultrusion creates orthotropic materials; Lg = longitudinal; Tr = transverse, according to the linear axis of the extrusion.

The following data relate to the properties of pultruded stems reinforced with rovings only:

PROPERTIES OF PULTRUDED PINS OUTFITTED WITH ROVINGS: ELECTRICAL GRADE
Polyester resins: High deflection temperature, isophthalic antiacid

| PROPERTY | ASTM NORME | UNIT | 65 à 70% GLASS | 70 à 75% GLASS |
|---|---|---|---|---|
| Stress | D-638 | MPa | 585 | 690 |
| Modulus (T) | | GPa | 41,340 | 44,780 |
| Deflection | D-790 | MPa | 585 | 690 |
| Modulus (F) | | GPa | 41,340 | 44,780 |
| Compression | D-695 | MPa | 413 | 482 |
| Modulus (C) | | GPa | 15,850 | 17,220 |
| Shear | | | nil | nil |
| Izod impact | D-265 | KPa cm/cm² | 840 | 1,050 |
| Torque | | MPa | 34.4 | 37.9 |
| Water absorption | D-570 | % | 0.10 | 0.09 |
| BARCOL hardness | | | 50 | 50 |
| Bead pressure | | | nil | nil |
| Weight loss 1.000 h. 200° C. | | % | 2.40 | 2.40 |
| Density | | g./cm³ | 2.05 | 2.05 |
| Thermal conductivity | | Kcal · m/m²h° C. | 0.26 | 0.26 |
| Coefficient of thermal expansion | | Mm/mm/° C. | $5.4 \times 10^{-6}$ | $5.4 \times 10^{-6}$ |
| Deflection temperature at 1819 KPa | D-648 | ° C. | 260 | 280 |
| Electric arc | D-495 | sec. | 180 | 180 |
| Dielectric strength (perp. oil) | D-149 | KV/mm | 17 | 17.7 |
| Dielectric constant | D-150 | | 5.39 | 5.7 |
| Dielectric loss | D-669 | 23° C. % | 1.01 | 1.01 |
| Tang. (delta) 60 Hz | | 100% | 4.35 | 4.00 |
| Resistance | D-229 | Ohm/cm $\times 10^{14}$ | 9 | 9.4 |
| Inflammability | | | nil | nil |

Preferably, the rail clamps are built to conform to the requirements usually required by transport companies.

| PROPERTY | STANDARD | REQUIREMENT |
|---|---|---|
| Combustibility | Method 1 of the NFPA 701 norm | Non combustible |
| Resistance before immersion | ASTM D 257, Voltage of 500 Vcc | Minimum 1600 megohms cm |
| Resistance after immersion | ASTM D 259, Voltage of 500 Vcc (cylinder immersed for 48 hours in a water bath) | Minimum 1600 megohms cm |
| Hardness | ASTM D2240 with a shore A hardness tester | Min: 70 shore A |

Although the preferred embodiments of the invention have been described above and illustrated in the figures, the invention is not limited to these embodiments, and various changes and modifications may be done by a person skilled in the art without departing from the scope or the spirit of the invention (shape of the rail clamp, orientation of the hole, alternative pultruded polymers and composites, etc.). Its use should also not be restricted to the field of public transportation. This piece may also be use in various industrial fields as well as any rail transportation.

What is claimed is:

1. A railway system comprising:
   a rail having an upper section and a lower section;
   at least one rail road saddle for supporting the lower section of the rail;
   at least one polymer composite rail clamp each being anti-corrosive, insulating and formed in one piece integrally composed of a first polymeric composition being a composite comprising a synthetic resin and reinforcing fibers for providing both mechanical strength and flexibility, each polymer composite rail clamp having a surface, the surface being for contacting the lower section of the rail and the polymer composite rail clamp being fastened to the at least one rail road saddle to allow a pressure of the surface against the lower section of the rail to prevent substantial displacement of the rail; and a fastener having a shank portion passing through a hole in the polymer composite rail clamp and the rail road saddle and a head portion in contact with an upper surface of the polymer composite rail clamp to apply the pressure;

the polymer composite rail clamp being the only component compressed between the rail and the head portion of the fastener.

2. The system according to claim 1, wherein the at least one rail clamp comprises a first plurality of rail clamps and a second plurality of rail clamps, the first plurality of rail clamps being placed on a first lateral side of the rail and the second plurality of rail clamps being placed on a second lateral side of the rail.

3. The system according to claim 2, wherein each rail clamp of the first plurality of rail clamps is offset from a corresponding rail clamp of the second plurality of rail clamps.

4. The system of claim 1, wherein the rail road saddle is anticorrosive, insulating and integrally composed of a second polymeric composition made by pultrusion, molding, casting, filament winding or winding.

5. The system of claim 1, wherein the polymeric composition is made by pultrusion, molding, casting, filament winding, compression molding or winding.

6. The system of claim 1, wherein the resin is chosen from epoxies, polyesters, vinyl esters and urethanes.

7. The system of claim 1, wherein the reinforcing fibers are chosen from glass, aramid, ceramic, filamented cardboard, sisal, cotton, flax or hemp.

8. The system of claim 7, wherein the reinforcing fibers are shaped as roving or mat.

9. The system of claim 1, wherein the first polymeric composition comprises a polymer chosen from polyesters, polyacetal homopolymers and polycarbonates.

10. The system of claim 1, wherein the rail clamp has a Barcol hardness from about 40 to about 50.

11. The system of claim 1, wherein the rail clamp has an electrical resistance, according to the ASTM D-229-01 norm, higher than $7 \text{ Ohm/cm} \times 10^{10}$.

12. The system of claim 1, wherein the rail clamp has a modulus of elasticity between 200,000 psi and 10,000,000 psi.

13. The system of claim 1, wherein the rail clamp has a tensile strength, according to the ASTM D-638-03 norm, between 7,000 psi and 120,000 psi.

14. The system of claim 1, wherein the rail clamp has a compression strength, according to the ASTM D 695-02 norm, between 12,000 psi and 70,000 psi.

15. The system of claim 1, wherein the rail clamp has a shearing strength of at least 2,000 psi.

16. The system of claim 1, wherein the rail clamp has a thermal expansion coefficient of at most $10 \times 10^{-6}$ In/In/° F.

17. The system of claim 1, wherein the fastener comprises a head portion that is in direct contact with an upper surface of the rail clamp and a shank portion extending through the hole in the rail clamp and the rail road saddle.

18. The system of claim 17, wherein the head portion contacts only a portion of the upper surface of the rail clamp, leaving a free area of the upper surface around the head portion.

19. The system of claim 17, wherein the fastener comprises a bolt.

20. The system of claim 19, wherein the head portion of the fastener further comprises a nut located in between the bolt and the polymer composite rail clamp.

* * * * *